(12) United States Patent
Al-Yateem

(10) Patent No.: US 8,343,274 B2  
(45) Date of Patent: Jan. 1, 2013

(54) ENVIRONMENTAL COMPOSITION AND METHOD FOR MAKING THE SAME

(76) Inventor: Abdullah A. Al-Yateem, Heteen (KW)

( * ) Notice: Subject to any disclaimer, the term of this patent is extended or adjusted under 35 U.S.C. 154(b) by 652 days.

(21) Appl. No.: 12/463,710

(22) Filed: May 11, 2009

(65) Prior Publication Data

US 2010/0282132 A1 Nov. 11, 2010

(51) Int. Cl.
*C04B 2/00* (2006.01)

(52) U.S. Cl. ........................... 106/801; 106/713

(58) Field of Classification Search ............ 106/721, 106/801
See application file for complete search history.

(56) References Cited

U.S. PATENT DOCUMENTS

| | | | |
|---|---|---|---|
| 4,678,514 A | 7/1987 | Deyhle | |
| 5,352,288 A * | 10/1994 | Mallow | 106/605 |
| 5,676,750 A | 10/1997 | Gleichmar | |
| 6,471,767 B1 | 10/2002 | Konczak | |
| 6,685,771 B2 | 2/2004 | Long | |
| 6,709,509 B2 | 3/2004 | Taylor-Smith | |
| 7,037,368 B2 | 5/2006 | Hoffis | |
| 7,128,780 B2 | 10/2006 | Matheson | |
| 7,141,112 B2 * | 11/2006 | Comrie | 106/697 |
| 7,347,896 B2 * | 3/2008 | Harrison | 106/738 |
| 7,390,357 B2 | 6/2008 | Skaarup Jensen | |
| 2003/0041785 A1 * | 3/2003 | Harrison | 106/801 |
| 2004/0040475 A1 * | 3/2004 | De La Roij | 106/819 |
| 2005/0103235 A1 * | 5/2005 | Harrison | 106/801 |
| 2005/0178296 A1 * | 8/2005 | Brothers et al. | 106/814 |
| 2010/0095871 A1 * | 4/2010 | Patil et al. | 106/692 |
| 2012/0024197 A1 * | 2/2012 | Lambertin et al. | 106/694 |

* cited by examiner

*Primary Examiner* — Paul Marcantoni
(74) *Attorney, Agent, or Firm* — Lowe Hauptman Ham & Berner, LLP

(57) ABSTRACT

A cement composition is made from a heat activated chemical salt selected from the group consisting of magnesium oxide, potassium oxide, sodium oxide, and calcium oxide and mixtures thereof. This activated salt is the mixed with hydraulic cement in an amount of 2½ to 3½ parts activated salt to one part hydraulic cement and the resulting mixture of hydraulic cement and activated salt is mixed with water and aggregate. In addition, industrial waste may be added to the mix in minor amounts of 5 to 30 percent.

3 Claims, 1 Drawing Sheet

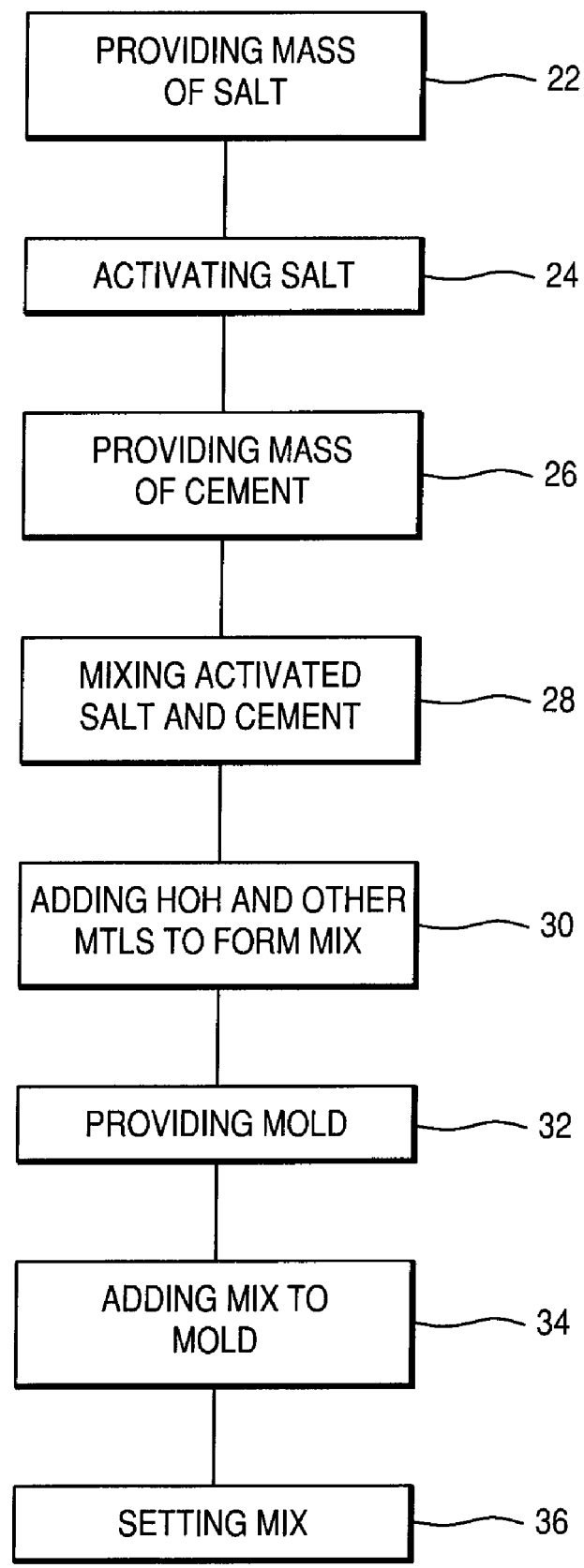

ENVIRONMENTAL COMPOSITION AND METHOD FOR MAKING THE SAME

FIELD OF THE INVENTION

This invention relates to a cement composition and method for making such compositions and more particularly to an environmentally compatible cement composition that incorporates chemical salts and industrial waste.

BACKGROUND FOR THE INVENTION

The problem of disposing of municipal and industrial waste has been recognized for many years. As a result, a number of approaches combined various waste materials with cement. For example a U.S. Pat. No. 4,678,514 of Deyhle et al. discloses a process for the disposal of combustible refuses. The process disposes a combustible refuse in the manufacture of clinker by preheating the partly calcining the cement raw meal in a preheater, burning in a rotary kiln and subsequently air cooling the clinker, the refuse being separately burned and the flue gas obtained thereby transfers its heat to the cement raw meal. In the process according to the invention, hot exhaust air from the clinker cooler is fed to the refuse incinerator and flue gas having a temperature of from 1000° to 1400° C., is produced during said incineration by means of which the cement raw meal is calcined. The slag of the refuse incineration is separately discharged.

A more recent approach to an environmental friendly utilization of asbestos-cement products are disclosed in a U.S. Pat. No. 5,676,750 of Gleichmar et al. The process includes a thermal process to transform the asbestos component. Inventively, this is achieved by a course reduction of the asbestos-cement products under black side conditions with maintained vacuum. Then, the material is ground to asbestos-cement meal and fed to the flame zone of the rotary kiln of a cement clinker production line. Depending on the fuel type used the portion of fed asbestos-cement meal varies between 2 and 5%, related to the amount of cement raw meal, substituting 2 to 5% of the cement raw meal mix at a time. The thermal transformation of the asbestos component takes place with temperatures of approximately 1800° C. in the burner zone. The modified residual substance becomes a constituent of the cement clinker due to assimilation in the kiln charge.

A further approach to waste disposal is taught by a U.S. Pat. No. 7,037,368 of Hoffis. The Hoffis patent describes a mid-kiln injection of waste-derived materials for the production of cement clinker. The method comprises the steps of introduction of non-traditional materials into the kiln, preferably at a mid-kiln location. The non-traditional materials are materials that are difficult, expensive or environmentally challenging for disposal. In one embodiment, weathered clinker is introduced into the kiln to admix with the raw material mix to augment clinker production. In another embodiment, bird, animal or human manure is added to the kiln so that the gaseous reducing agents can be released by the manure and combine with certain noxious gases generated during the clinker production to thereby reduce the noxious gas output. In another embodiment, other non-traditional waste-derived fuels are added to the kiln during clinker production, including railroad ties coated with creosote, industrial, commercial and consumer rubber components, such as rubber hoses, unshredded plastics and organic materials, such as bird and animal meal.

In addition, a U.S. Pat. No. 7,128,780 of Matheson et al. discloses a process for producing building materials, such as asphalt, cement, concrete, mortar, or plaster board from liquid paint sludge containing water and paint solids produced from overspray in commercial paint booth operations. The preferred embodiment comprises adding the liquid paint sludge as the hydrating agent directly to the building material mix.

Notwithstanding the above, it is presently believed that there is a need for and a potential commercial market for an environmentally compatible cement composition and method for making the same in accordance with the present invention. There should be a commercial market for such compositions and methods because a lower firing temperature of the kiln reduces the use of energy, uses less fossil fuels and offers an opportunity to capture the $CO_2$ gases produced from heating magnesium. In addition, the heating process produces reactive chemical salts that are added to a predetermined, but variable amount of hydraulic cement and if desired reactive waste. The result is an environmental friendly cement that when blended with water and aggregates such as sand or gravel, placed in molds and cast into blocks or other structures.

BRIEF SUMMARY OF THE INVENTION

In essence, the present invention contemplates a cement composition comprising or consisting of a reactive chemical salt selected from the group consisting of magnesium oxide (MgO) potassium oxide ($K_2O$), sodium oxide ($Na_2O$), calcium oxide (CaO) and mixtures thereof. In a preferred embodiment of the invention the reactive chemical salt consists of magnesium oxide. The reactive salt is activated by heating to a temperature between about 650° C. and 700° C. and preferably about 675° C. for a period of at least about 15 minutes in a kiln. The activated salt is then mixed with hydraulic cement in an amount of 2½ to 3½ parts activated salt to one part hydraulic cement. The resulting mixture of hydraulic cement and activated salt is mixed with water and aggregate.

In a preferred embodiment of the invention the activated salt is magnesium oxide that has been heated to about 675° C. for a period of at least about 15 minutes and wherein about three parts activated salt to one part hydraulic cement is mixed.

The invention will now be described in connection with the accompanying drawing.

DESCRIPTION OF THE DRAWINGS

FIG. 1 is a flow chart illustrating the steps in a process for making an environmental friendly concrete structure in accordance with the present invention.

DESCRIPTION OF THE PREFERRED EMBODIMENTS OF THE INVENTION

In one preferred embodiment of the invention, a mass of relatively pure magnesium oxide is placed in a kiln and heated to between about 650° C. to about 700° C. and preferably to about 675° C. This treatment produces an activated salt that is then mixed with cement. In a preferred embodiment of the invention the activated or activatible salt is magnesium oxide that is mixed with hydraulic cement preferably Portland cement with about 2½ to 3½ parts activated magnesium oxide and preferably three parts activated magnesium oxide to one part hydraulic cement. The resulting mixture is then made into a concrete structure by adding water and aggregate and mixing in the same manner as with conventional cement. The cement, water, aggregate and up to about 30% waste such as municipal waste is added to a mold and allowed to set.

In a second preferred embodiment of the invention, a mass of relatively pure potassium oxide is placed in a kiln and heated to between about 650° C. to about 700° C. and preferably to about 675° C. This treatment produces an activated salt that is then mixed with cement. In a preferred embodiment of the invention the activated or activatible salt is potassium oxide that is mixed with hydraulic cement preferably Portland cement with about 2½ to 3½ parts activated potassium oxide and preferably three parts activated potassium oxide to one part hydraulic cement. The resulting mixture is then made into a concrete structure by adding water and aggregate and mixing in the same manner as with conventional cement. The cement, water, aggregate and up to about 30% waste such as waste from a paper plant is added to a mold and allowed to set.

A third preferred embodiment of the invention, a mass of relatively pure sodium oxide is placed in a kiln and heated to between about 650° C. to about 700° C. and preferably to about 675° C. This treatment produces an activated salt that is then mixed with cement. In a preferred embodiment of the invention the activated or activatible salt is sodium oxide that is mixed with hydraulic cement preferably Portland cement with about 2½ to 3½ parts activated sodium oxide and preferably three parts activated sodium oxide to one part hydraulic cement. The resulting mixture is then made into a concrete structure by adding water and aggregate and mixing in the same manner as with conventional cement. The cement, water, aggregate and up to about 30% waste such as waste from a paper factory is added to a mold and allowed to set.

In a further preferred embodiment of the invention, a mass of relatively pure calcium oxide is placed in a kiln and heated to between about 650° C. to about 700° C. and preferably to about 675° C. This treatment produces an activated salt that is then mixed with cement. In a preferred embodiment of the invention the activated or activatible salt is calcium oxide that is mixed with hydraulic cement preferably Portland cement with about 2½ to 3½ parts activated calcium oxide and preferably three parts activated calcium oxide to one part hydraulic cement. The resulting mixture is then made into a concrete structure by adding water and aggregate and mixing in the same manner as with conventional cement. The cement, water, aggregate and up to about 30% waste such as waste from a paper factory is added to a mold and allowed to set.

In a still further preferred embodiment of the invention, a mixture of two of the activatible salts is placed in a kiln and heated to between about 650° C. to about 700° C. and preferably to about 675° C. This treatment produces an activated salt that is then mixed with cement. In a preferred embodiment of the invention the activated or activatible salt is a mixture of two of the activatible salts that is mixed with hydraulic cement preferably Portland cement with about 2½ to 3½ parts activated salt mixture of two of the activatible salts and preferably three parts activated salt mixture to one part hydraulic cement. The resulting mixture is then made into a concrete structure by adding water and aggregate and mixing in the same manner as with conventional cement. The cement, water, aggregate and up to about 30% waste such as waste from a paper factory is added to a mold and allowed to set.

In a further preferred embodiment of the invention a composition consists of a method for preparing environmentally friendly cement in accordance with the present invention will now be described with reference to FIG. 1. The method includes the step of preparing a reactive chemical salt selected from the group consisting of magnesium oxide, potassium oxide, sodium oxide, calcium oxide and mixtures thereof in a conventional manner in step 20. The reactive chemical salt is then activated by heating in a kiln at a temperature of about 650° C. to about 700° C. for a period of at least about 15 minutes in step 22. Then, the activated salt is added to Portland cement in step 24 to produce a mixture of about 3 parts activated salt to 1 part cement. This combination of activated salt and cement is mixed in a conventional manner in step 26. Water and aggregate are added in a conventional manner in step 28 and the environmental friendly cement is poured into a mold in step 30 and cast into a final structure in step 32.

While the invention has been described in connection with its preferred embodiments it should be recognized that changes and modifications may be made therein without departing from the scope of the appended claims.

What is claimed is:

1. A cement composition consisting of an activated magnesium oxide prepared by oxidizing magnesium metal and subsequently activated by heating in a kiln to a temperature of 675° C. for a period of at least 15 minutes, and Portland cement, and wherein said activated magnesium oxide is mixed with said Portland cement in an amount of three parts activated magnesium oxide to one part Portland cement and wherein the mixture of Portland cement and activated magnesium oxide is mixed with water, aggregate and up to 30% municipal waste.

2. A cement composition according to claim 1 in which said activated magnesium oxide is mixed with hydraulic cement in the ratio of about 2½ parts activated salt to one part of hydraulic cement.

3. A cement composition according to claim 1 in which said activated magnesium oxide is mixed with hydraulic cement in the ratio of about 3½ parts activated salt to one part of hydraulic cement.

* * * * *